June 21, 1949.                F. W. SCHWINN                2,473,912
                              TIRE RELIEF VALVE
                             Filed Aug. 26, 1944
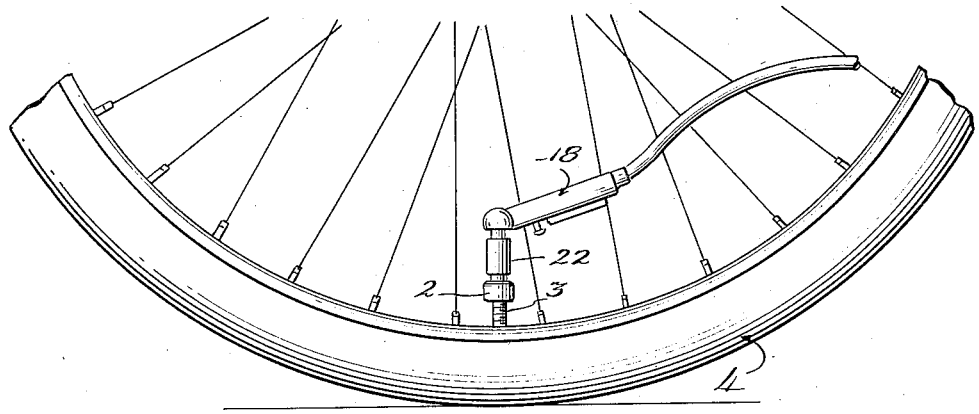
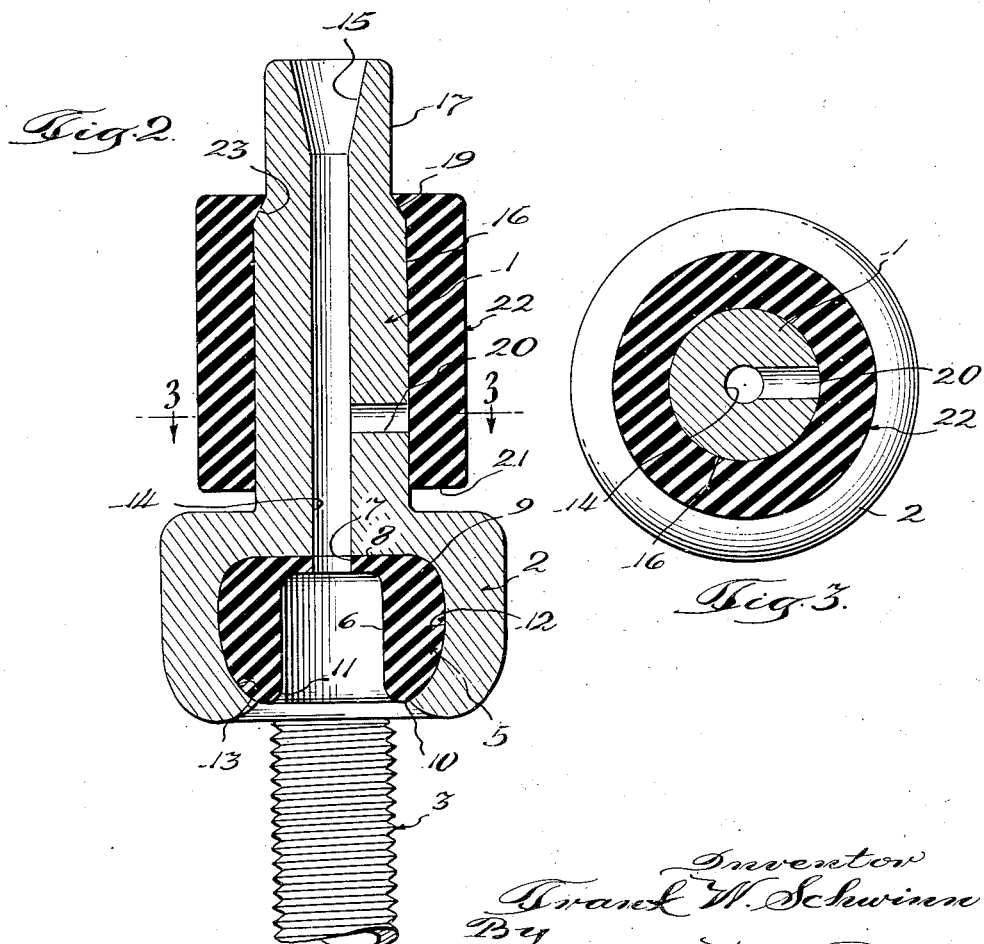

Patented June 21, 1949

2,473,912

UNITED STATES PATENT OFFICE 2,473,912

TIRE RELIEF VALVE

Frank W. Schwinn, Chicago, Ill.

Application August 26, 1944, Serial No. 551,277

1 Claim. (Cl. 137—53)

The present invention relates to tire inflation relief valves, and is particularly concerned with the provision of an improved tire inflation relief valve which is constructed for use in effecting the inflation of a tire to one predetermined pressure.

One of the objects of the invention is the provision of an improved tire inflation relief valve which is simple in construction and which eliminates the necessity for the operator to take any readings in the filling of the tire to proper pressure, so that the operation is reduced to a matter of mere connection to the source of pressure through the relief valve until an audible signal is given, without any possibility of over-inflation.

Another object of the invention is the provision of an improved tire inflation relief valve which is adapted to be used in inflating tires to a predetermined pressure, and the characteristics of which are substantially the same throughout a long period of use and under various different conditions of heat, cold, etc.

Another object of the invention is the provision of an improved tire inflation relief valve which eliminates any possibility of over-inflation and which may be used by persons unskilled in the art, and which eliminates the necessity for the user to know the pressure that is proper for the tire with which the relief valve is used.

Another object of the invention is the provision of an improved tire inflation relief valve of the character described, which is adapted to be attached to a valve stem with a minimum amount of effort and on which the regular tire inflation chuck at a filling station may be used during the inflation of the tire.

Other objects and advantages of the invention will be apparent from the following description and the accompanying drawing, in which similar characters of reference indicate similar parts throughout the several views.

Referring to the single sheet of drawings,

Figure 1 is a fragmentary elevational view of a cycle tire mounted on a wheel and having its valve stem connected to the tire inflation relief valve, which in turn is connected to a tire inflation chuck;

Fig. 2 is an axial sectional view, taken through the tire inflation relief valve which is shown in position to be applied to the usual valve stem;

Fig. 3 is a sectional view, taken on the plane of the line 3—3 of Fig. 2, looking in the direction of the arrows;

The present tire inflation relief valve may consist of a tubular body 1, provided with a head or enlargement 2, that is adapted to serve as a chuck for engaging the valve stem 3 of the tire 4.

The enlargement 2 may be substantially cylindrical in form, and it is of sufficient size to house a tubular cup-shaped member 5, having a cylindrical bore 6 leading to a counter bore 7 in its end wall 8.

The cup-shaped member 5 is preferably made of resilient rubber, which may be natural or synthetic, and the bore 6 is of sufficient size so that when the valve stem 3 is pressed into the bore 6, a fluid-tight joint is effected between the valve stem 3 and the rubber member 5.

The external shape of the rubber member 5 may be varied, but it is preferably provided with rounded corners at 9 near the top of the cup, and with a rounded edge at 10 near the cup opening. This provides the opening of the bore 6 with a tapered formation at 11 and the recess 12 for the member 5, and the head 2 may overhang the side wall of the member 5 at the curved portion 13 so as to retain the rubber member 5 in its socket 12.

The recess 12 in the head 2 communicates with a centrally located bore 14 in the tubular body 1, and the bore 14 may communicate with a tapered bore 15 at the inlet end of the relief valve.

Tubular body 1 is preferably provided with a cylindrical outer wall 16 extending over the major portion of its length, and the body may have a reduced cylindrical end portion 17 for engagement with the usual chuck on a tire inflation relief valve and valve 18. At the point 19 the body 1 may have a tapered frusto conical outer surface.

The body 1 also has a radially extending air escape bore 20, extending from bore 14 to the outer cylindrical surface 16 and located near the lower end 21 of a tubular synthetic rubber member 22 which surrounds the cylindrical body surface 16.

This tubular synthetic rubber member 22 may have a complementary inwardly extending frusto conical surface 23 for engaging the tapered surface 19 of the body 1.

The tubular resilient synthetic rubber member 22 is provided with a wall thickness which is predetermined with respect to the other portions of the device, and the inside diameter of this tubular member 22 is also predetermined, as this controls the initial stretch of the rubber member 22.

The size of the hole 20 and its location and the number of holes are also predetermined so that at a certain pressure in the tire, which for example, might be 32 pounds for balloon tires, the total thrust which is exerted on the inside of the tubular member 22 at the bore 20 is sufficient to stretch the member 22 and force it away from the cylindrical surface 16 between the hole 20 and the lower edge 21 of the member 22.

When the pressure rises to this predetermined point, the rubber member 22 is stretched outward to provide a crack through which the air escapes to prevent further inflation. For a high pressure tire for cycles the inflation pressure would be substantially 60 pounds, and in this case the size of the apertures would be decreased, and they might be of a lesser number, while the thickness of the rubber tube 22 might be increased so that the bore 20 would be opened only after a pressure of substantially 60 pounds is reached.

It should be understood that there is added to the pressure of the tire, the pressure which is necessary to overcome the valve spring, and therefore when the pressure of the tire is 60 pounds, the escaping pressure at the bore 20 will be slightly greater by the amount of pressure that is necessary to overcome the valve spring, all of which is predetermined in the construction of the device.

While I have illustrated the use of only one hole 20, it is to be understood that a number of holes may be used, or they may be of larger or smaller size, depending upon the pressure which is to be applied to the particular tire with which the relief valve is to be used.

Additional sizes and the proportions of relief valves would be provided for motor car, truck or air craft types, and this may be accomplished by merely changing the characteristics of the tubular rubber member 22 that is applied to the body 1.

The body 1 is preferably made of metal, such as steel, brass, or various different materials, such as plastics having a suitable strength.

It will thus be observed that I have invented an improved tire inflation relief valve which is very simple and may be constructed at a small cost. As the synthetic rubber used in the construction is resistant to deterioration by oils, acids, etc., the relief valve is adapted to retain its characteristics under all conditions of use. Furthermore, such synthetic rubbers retain their resilient and other characteristics under various high and low temperatures. The present relief valve is also adapted to be used under various extremes of temperature without substantial variation from its predetermined characteristics.

The method of use of my tire inflation relief valve is as follows: The rubber chuck 5 is forced on the member 3 to be inflated, then the usual tire inflation chuck at the service station is applied to the cylindrical end portion 17 of the relief valve, and the valve lever is pressed to effect the application of air under pressure.

The air passes in through the relief valve and opens the valve in the valve stem 3 and continues to pass into the tire until the pressure is built up, which would be substantially 32 pounds for a balloon tire. At this time the pressure of the relief valve is slightly more by the amount of pressure which is necessary to actuate the valve spring in the valve stem 3. When the pressure relief valve reaches the predetermined amount, it is sufficient in the bore 20 to provide a thrust against the tubular synthetic rubber member 22, this member thereby providing a crack for the escape of air. The audible hiss produced by the escape of air tells the operator that the tire is filled to the pressure desired and over-inflation cannot result, as the air passes out of the bore 20 and under the lower edge of the rubber member 22 to the atmosphere, thereby reducing the pressure in the relief valve so that it is not sufficient to cause further inflation of the tire.

Such a relief valve may be used by children or parties unfamiliar with the proper amount of pressure, because it automatically relieves any excess pressure when the tire has reached the pressure for which it is rated.

Both under-inflation and over-inflation are avoided, because it will be easier to keep the tires at proper pressure with such a simple automatic tire inflation relief valve.

The present relief valve is adapted to be used for a long period of time in hot or cold weather without substantial variation in its characteristics, and may be produced at a very low cost, so that it may be placed within the reach of a vast number of users.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

In a tire inflation relief valve, the combination comprising a rigid body member having a longitudinal through bore and having three portions of successively larger external diameter including a small inlet end portion, a cylindrical mid-portion separated from the inlet end portion by a shoulder, and a large outlet end portion, said outlet end portion being longitudinally counterbored and formed to provide a cup-shaped recess having rounded corners and an outer rim which extend inwardly of the recess in a radial direction, a substantially cup-shaped resilient member disposed in said recess and having an opening in its end wall aligned with said through bore, said cup-shaped member being retained in position by said radially extending outer rim, the open end of said cup-shaped member opening outwardly of said recess, said cylindrical mid-portion having a radial bore therein communicating with the through bore to provide an escape port, and a resilient outer sleeve fitting snugly over said cylindrical mid-portion of the body member to close said port until a predetermined pressure is reached, said resilient outer sleeve having an internal shoulder engaging said shoulder at the end of the cylindrical portion to locate the sleeve.

FRANK W. SCHWINN.

REFERENCES CITED

The following references are of record in the file of this patent:

UNITED STATES PATENTS

| Number | Name | Date |
|---|---|---|
| 384,306 | Bourdil | June 12, 1888 |
| 1,156,328 | Thayer | Oct. 12, 1915 |
| 1,294,377 | Badgley | Feb. 18, 1919 |
| 1,299,398 | Kahn | Apr. 1, 1919 |
| 1,326,445 | Fewlass | Dec. 30, 1919 |
| 1,582,928 | Hoag | May 4, 1926 |
| 1,667,649 | Boynton | Apr. 24, 1928 |
| 2,191,611 | Eshbaugh | Feb. 27, 1940 |

FOREIGN PATENTS

| Number | Country | Date |
|---|---|---|
| 237,267 | Great Britain | 1925 |
| 296,965 | Great Britain | Sept. 13, 1928 |